(12) United States Patent
Sawamoto

(10) Patent No.: US 11,421,745 B2
(45) Date of Patent: Aug. 23, 2022

(54) CLUTCH, MOTOR, AND METHOD FOR MANUFACTURING CLUTCH

(71) Applicant: DENSO CORPORATION, Kariya (JP)

(72) Inventor: Daisuke Sawamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 17/052,429

(22) PCT Filed: May 31, 2019

(86) PCT No.: PCT/JP2019/021853
§ 371 (c)(1),
(2) Date: Nov. 2, 2020

(87) PCT Pub. No.: WO2019/235396
PCT Pub. Date: Dec. 12, 2019

(65) Prior Publication Data
US 2021/0054884 A1    Feb. 25, 2021

(30) Foreign Application Priority Data

Jun. 8, 2018 (JP) .............................. JP2018-110412

(51) Int. Cl.
*F16D 41/066* (2006.01)
*F16D 41/10* (2006.01)
*H02K 7/10* (2006.01)
*H02K 7/108* (2006.01)
(Continued)

(52) U.S. Cl.
CPC .......... *F16D 41/066* (2013.01); *E05F 15/697* (2015.01); *F16D 41/10* (2013.01); *H02K 7/10* (2013.01); *H02K 7/108* (2013.01); *H02K 7/1166* (2013.01); *F16D 2250/0084* (2013.01); *F16D 2300/06* (2013.01)

(58) Field of Classification Search
CPC ........ F16D 15/00; F16D 41/06; F16D 41/066;
F16D 41/067; F16D 41/10; F16D 41/105;
F16D 43/02; F16D 2250/0084; F16D
2300/06; H02K 7/10; H02K 7/102; H02K
7/108; H02K 7/112; H02K 7/1166; E05F
15/697; E05Y 2900/55
See application file for complete search history.

(56) References Cited

U.S. PATENT DOCUMENTS 8,708,125 B2 * 4/2014 Yamashita ............. H02K 7/108
192/223.2
2017/0009822 A1 1/2017 Oguri
2019/0331175 A1 * 10/2019 Oguri .................. H02K 7/1166

* cited by examiner

*Primary Examiner* — Richard M Lorence
(74) *Attorney, Agent, or Firm* — Oliff PLC

(57) ABSTRACT

A clutch includes a clutch housing, a drive-side rotation body, a driven-side rotation body, a rolling element arranged between an inner circumferential surface of the clutch housing and the driven-side rotation body, a support member, and grease. The support member holds the rolling element between the inner circumferential surface of the clutch housing and the driven-side rotation body. The grease is located between the inner circumferential surface of the clutch housing and the rolling element. The support member includes a guide arranged on a distal surface of the support member. When the grease is unevenly applied to the inner circumferential surface of the clutch housing, the guide is (Continued)

configured to guide the grease to be evenly applied to the inner circumferential surface of the clutch housing when inserted into the clutch housing.

5 Claims, 11 Drawing Sheets

(51) Int. Cl.
*H02K 7/116* (2006.01)
*E05F 15/697* (2015.01)

CLUTCH, MOTOR, AND METHOD FOR MANUFACTURING CLUTCH

CROSS-REFERENCE TO RELATED APPLICATIONS

This application is based upon and claims the benefit of priority from prior Japanese Patent Application No. 2018-110412, filed on Jun. 8, 2018, the entire contents of which are incorporated herein by reference.

TECHNICAL FIELD

The present disclosure relates to a clutch, a motor, and a method for manufacturing a clutch.

BACKGROUND ART

A typical motor used as a drive source for an onboard power window device or the like may include a motor unit and an output unit. The motor unit includes a rotation shaft configured to be driven to rotate. The output unit includes a driven shaft configured to receive rotational drive force from the rotation shaft and outputs the rotational drive force received by the driven shaft. The rotation shaft and the driven shaft are coupled by a clutch that is actuated so as not to transmit rotational force from the driven shaft to the rotation shaft while transmitting rotational drive force from the rotation shaft to the driven shaft (for example, refer to Patent Document 1).

Such a clutch includes a drive-side rotation body that rotates integrally with the rotation shaft, a driven-side rotation body that is engageable with the drive-side rotation body in a rotation direction and rotates integrally with the driven shaft, and a tubular clutch housing into which the drive-side rotation body and the driven-side rotation body are inserted. In addition, a rolling element is arranged between the inner circumferential surface of the clutch housing and the driven-side rotation body. When the rotation shaft is not driven to rotate, the rolling element is held (used as a wedge) by the inner circumferential surface of the clutch housing and the driven-side rotation body to hamper rotation of the driven-side rotation body (i.e., rotation of driven shaft). The rolling element is held by a support member that is inserted into the clutch housing so that the center axis of the rolling element extends parallel to the rotation axis of the drive-side rotation body. When the rotation shaft is driven to rotate, the support member rotates together with the drive-side rotation body about the rotation axis of the drive-side rotation body. When the rotation shaft is driven to rotate, the rolling element rotates together with the drive-side rotation body and the driven-side rotation body about the rotation axis of the drive-side rotation body along the inner circumferential surface of the clutch housing while being supported by the support member. The clutch further includes grease located between the inner circumferential surface of the clutch housing and the rolling element to obtain an appropriate frictional force.

PRIOR ART DOCUMENT

Patent Document

Patent Document 1: Japanese Laid-Open Patent Publication No. 2017-17952

SUMMARY OF THE INVENTION

In the clutch described above, for example, the grease may be collectively injected into a large space of the clutch housing, and each member may be rotated so that the grease is evenly applied to the inner circumferential surface of the clutch housing. However, in such a clutch, this may adversely affect the initial properties. For example, the grease may be hard and act as resistance in an initial state.

It is an objective of the present disclosure to provide a clutch, a motor, and a method for manufacturing a clutch that improve initial properties.

To achieve the above objective, a clutch according to a first aspect of the present disclosure includes an annular clutch housing (41), a drive-side rotation body (42) configured to be driven to rotate, a driven-side rotation body (45) to which rotational drive force is transmitted from the drive-side rotation body, a rolling element (44) arranged between an inner circumferential surface of the clutch housing and the driven-side rotation body, a support member (43), and grease (GR). When the drive-side rotation body is driven to rotate, the rolling element rotates together with the drive-side rotation body about a rotation axis of the drive-side rotation body. When the drive-side rotation body is not driven to rotate, the rolling element is held between the inner circumferential surface (41c) of the clutch housing and the driven-side rotation body and hampers rotation of the driven-side rotation body. When inserted into and fastened to the clutch housing from a distal side, the support member holds the rolling element between the inner circumferential surface of the clutch housing and the driven-side rotation body and rotates together with the drive-side rotation body about the rotation axis of the drive-side rotation body. The grease is located between the inner circumferential surface of the clutch housing and the rolling element. The support member includes a guide (66a, 66b) arranged on a distal surface of the support member. When the grease is unevenly applied to the inner circumferential surface of the clutch housing, the guide is configured to guide the grease to be evenly applied to the inner circumferential surface of the clutch housing when inserted into the clutch housing.

In this configuration, the distal surface of the support member includes the guide configured to guide grease that is unevenly applied to the inner circumferential surface of the clutch housing so that when inserted into the clutch housing, the grease is evenly applied to the inner circumferential surface of the clutch housing. As a result, when the support member is coupled to the clutch housing, the grease is nearly evenly applied. This improves initial properties of the clutch.

To achieve the above objective, a second aspect of the present disclosure provides a method for manufacturing a clutch. The clutch includes an annular clutch housing, a drive-side rotation body configured to be driven to rotate, a driven-side rotation body to which rotational drive force is transmitted from the drive-side rotation body, a rolling element (44) arranged between an inner circumferential surface of the clutch housing and the driven-side rotation body, a support member (43), and grease (GR). When the drive-side rotation body is driven to rotate, the rolling element rotates together with the drive-side rotation body about a rotation axis of the drive-side rotation body. When the drive-side rotation body is not driven to rotate, the rolling element is held between the inner circumferential surface of the clutch housing and the driven-side rotation body and hampers rotation of the driven-side rotation body. When inserted into and coupled to the clutch housing from a distal side, the support member holds the rolling element between the inner circumferential surface of the clutch housing and the driven-side rotation body and rotates together with the drive-side rotation body about the rotation axis of the drive-side rotation body. The grease is located at least between the inner circumferential surface of the clutch housing and the rolling element. The method includes applying the grease to a basal side of the inner circumferential surface of the clutch housing. The method further includes, after the applying, inserting the support member into the clutch housing, thereby spreading the grease to a distal side of the inner circumferential surface of the clutch housing.

The method includes applying grease to the basal side of the inner circumferential surface of the clutch housing and inserting the support member into the clutch housing, thereby spreading the grease to the distal side of the inner circumferential surface of the clutch housing. As a result, when the support member is coupled to the clutch housing, the grease is nearly evenly applied. This improves initial properties of the clutch.

BRIEF DESCRIPTION OF THE DRAWINGS

The above objectives and other objectives of the present disclosure and aspects and advantages of the present disclosure will become apparent from the following description, taken in conjunction with the accompanying drawings. In the drawings.

MODES FOR CARRYING OUT THE INVENTION

An embodiment of a motor including a clutch will be described below.

Figure 1:
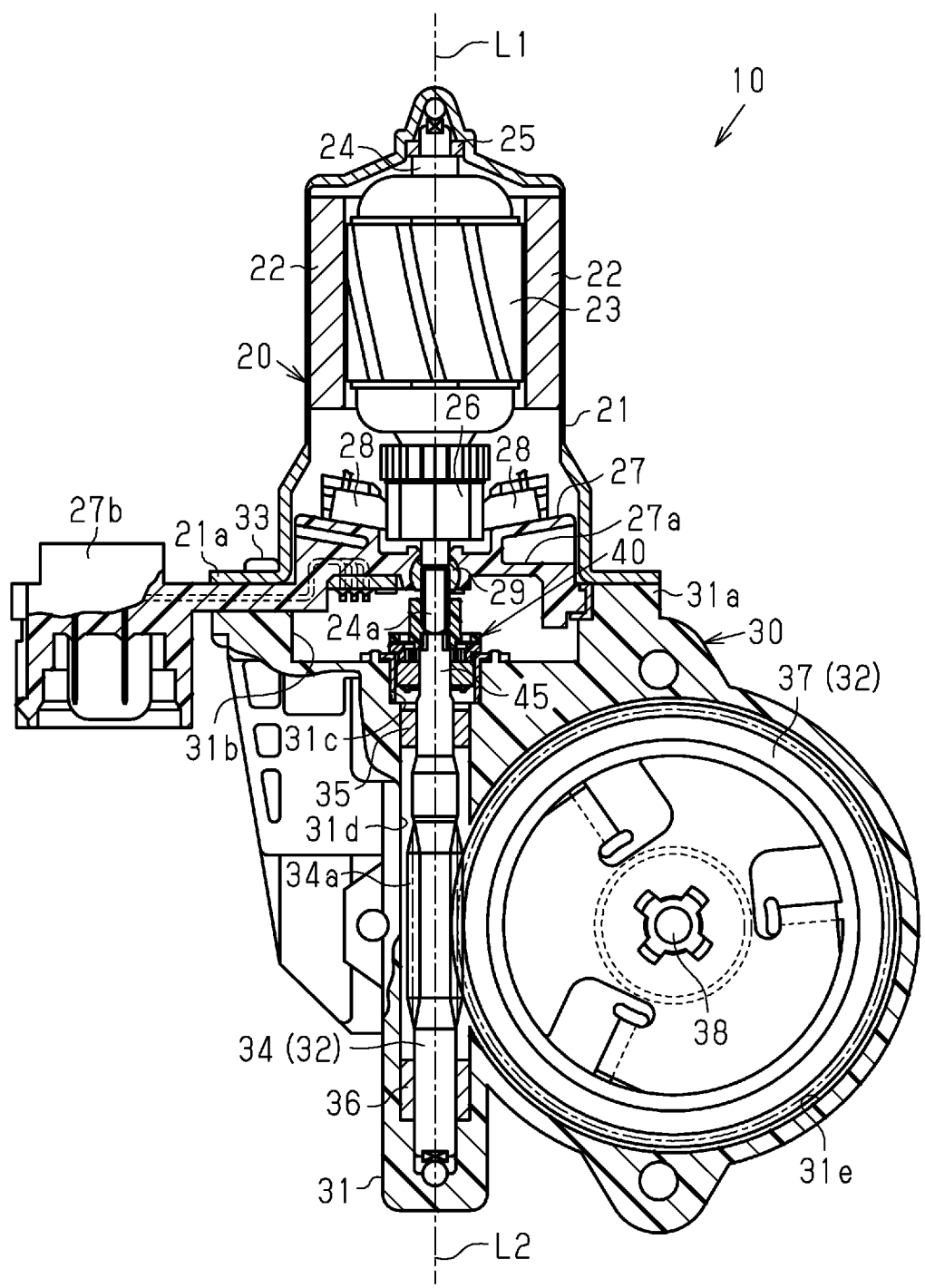
FIG. 1 is a cross-sectional view showing an embodiment of a motor.

FIG. 1 shows the present embodiment of a motor 10 included in a power window device that electrically raises and lowers a vehicle window glass. The motor 10 includes a motor unit 20 and an output unit 30 that are coupled integrally with each other. The motor unit 20 generates rotational force. The output unit 30 reduces the speed of rotation output by the motor unit 20 and outputs the rotation.

The motor 10 further includes a clutch 40 arranged in a drive coupling part between the motor unit 20 and the output unit 30.

The motor unit 20 of the present embodiment is formed of a direct current motor. The motor unit 20 includes a tubular yoke housing 21 (hereafter, referred to as yoke 21) having a closed end and an inner circumferential surface to which magnets 22 are fixed. An armature 23 is located at an inner side of the magnets 22. The armature 23 includes a rotation shaft 24 located in a central portion of the yoke 21. The rotation shaft 24 includes a basal end (upper end in FIG. 1) rotationally supported by a bearing 25 arranged on the center of the closed end of the yoke 21. A tubular commutator 26 is fixed to the rotation shaft 24 at a portion near a distal end of the rotation shaft 24. The distal end (lower end in FIG. 1) of the rotation shaft 24 includes a coupling portion 24a having two parallel flat sections obtained by parallelly cutting a cylindrical rod.

A flange 21a extends outward from the opening of the yoke 21. A brush holder 27 is fitted to the opening of the yoke 21. The brush holder 27 includes a holder body 27a that is shaped to close the opening of the yoke 21 and a connector portion 27b that projects from the holder body 27a toward a radially outer side of the yoke 21 and is connected to an external connector, which is not shown in the drawings. The holder body 27a holds power feeding brushes 28 that are electrically connected to the connector portion 27b by wires, which are not shown in the drawings. The power feeding brushes 28 slide on the commutator 26. The holder body 27a also holds a bearing 29 on a central portion of the holder body 27a. The bearing 29 rotationally supports a portion of the rotation shaft 24 located between the commutator 26 and the coupling portion 24a. The armature 23 (rotation shaft 24) is configured to be driven to rotate, that is, the motor unit 20 is driven to rotate, when external power supplied to the brushes 28 through the connector portion 27b is supplied to the armature 23 through the commutator 26.

The output unit 30 is formed by accommodating a speed reduction mechanism 32 and the like in a resin gear housing 31. A portion (upper end in FIG. 1) of the gear housing 31 opposed to the motor unit 20 in the axial direction includes a fastening portion 31a that fastens the gear housing 31 to the motor unit 20. The outer shape of the fastening portion 31a is identical to the outer shape of the flange 21a of the yoke 21. The fastening portion 31a includes an accommodation recess 31b that is open toward the inner side of the yoke 21. When the holder body 27a of the brush holder 27 is partially inserted into the accommodation recess 31b, the flange 21a is in contact with the fastening portion 31a and is fastened to the fastening portion 31a by a screw 33. As a result, the yoke 21 is fixed to the gear housing 31, and the motor unit 20 is integrated with the output unit 30. The brush holder 27 is held between the yoke 21 and the fastening portion 31a.

The gear housing 31 includes a clutch receptacle 31c recessed from the center of the bottom of the accommodation recess 31b in the axial direction and a worm shaft retainer 31d extending from the center of the bottom of the clutch receptacle 31c in a direction extending along a center axis L1 of the rotation shaft 24. The gear housing 31 further includes a wheel retainer 31e recessed from a side (right side in FIG. 1) of the worm shaft retainer 31d. The wheel retainer 31e is connected to the worm shaft retainer 31d at a central portion of the worm shaft retainer 31d in the axial direction (longitudinal direction).

The worm shaft retainer 31d accommodates a worm shaft 34 used as a cylindrical-rod-shaped driven shaft. The worm shaft 34 is formed from a metal material, and an axial central portion of the worm shaft 34 includes a worm part 34a having thread teeth. Two bearings 35 and 36 are arranged on axial opposite ends of the worm shaft retainer 31d to rotationally support axial opposite ends of the worm shaft 34. When the worm shaft 34 is located in the worm shaft retainer 31d and rotationally supported by the bearing 35 and 36, the worm shaft 34 is coaxial with the rotation shaft 24, that is, the center axis L1 of the rotation shaft 24 is aligned with a center axis L2 of the worm shaft 34.

The wheel retainer 31e rotationally accommodates a discoid worm wheel 37 that engages with the worm shaft 34a of the worm shaft 34. The speed reduction mechanism 32 includes the worm wheel 37 and the worm shaft 34. More specifically, the speed reduction mechanism 32 of the present embodiment is a worm speed reduction mechanism (i.e., worm gear). An output shaft 38 extends in a radial central portion of the worm wheel 37 in the axial direction of the worm wheel 37 (direction orthogonal to the plane of FIG. 1) and rotates integrally with the worm wheel 37. The output shaft 38 is coupled to a vehicle window glass by a window regulator, which is not shown in the drawings.

The clutch receptacle 31c accommodates the clutch 40 that couples the rotation shaft 24 of the motor unit 20 to the worm shaft 34 of the output unit 30.

Figure 2:
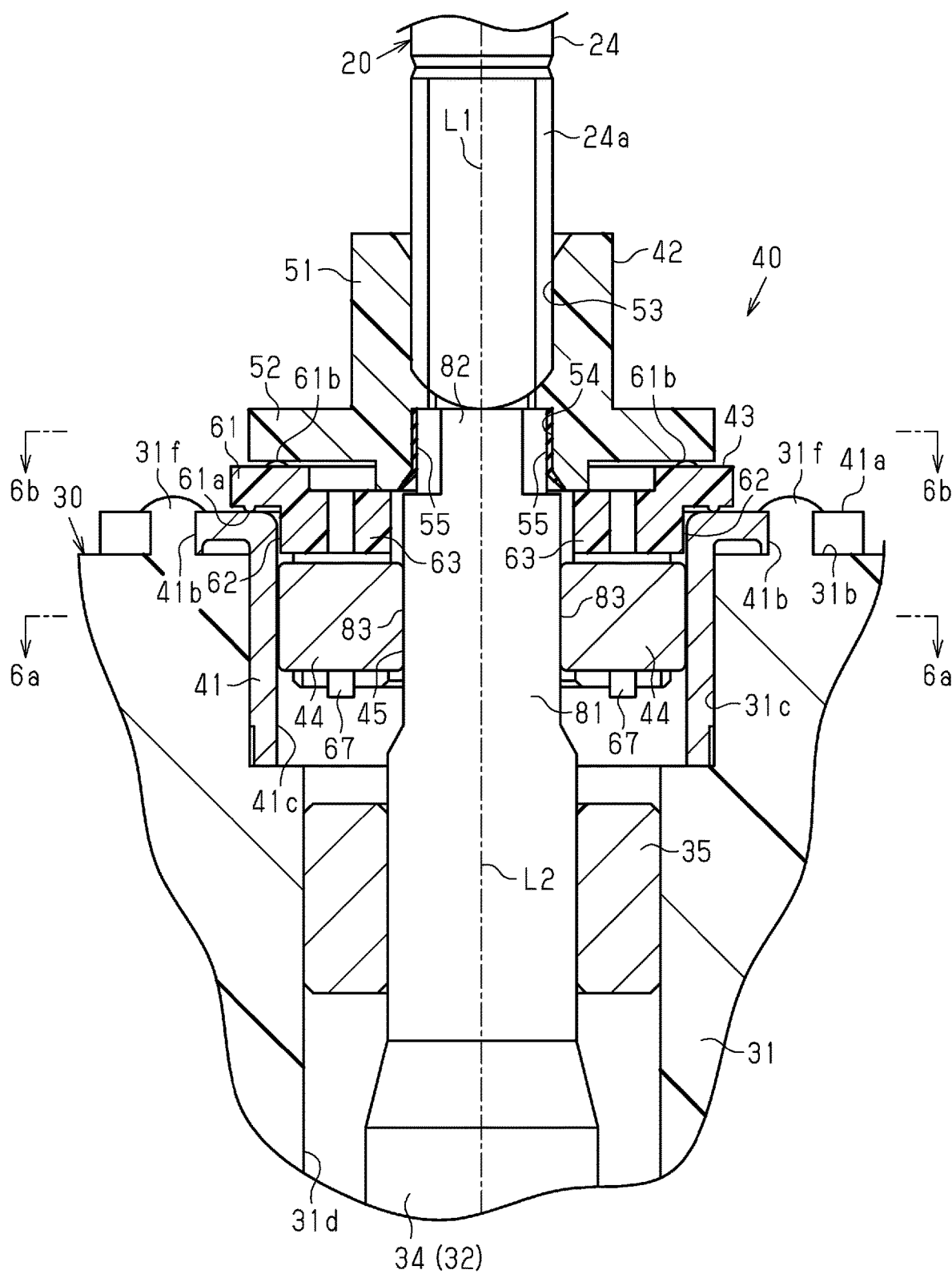
FIG. 2 is a partial enlarged cross-sectional view of the motor of the embodiment.
Figure 3:
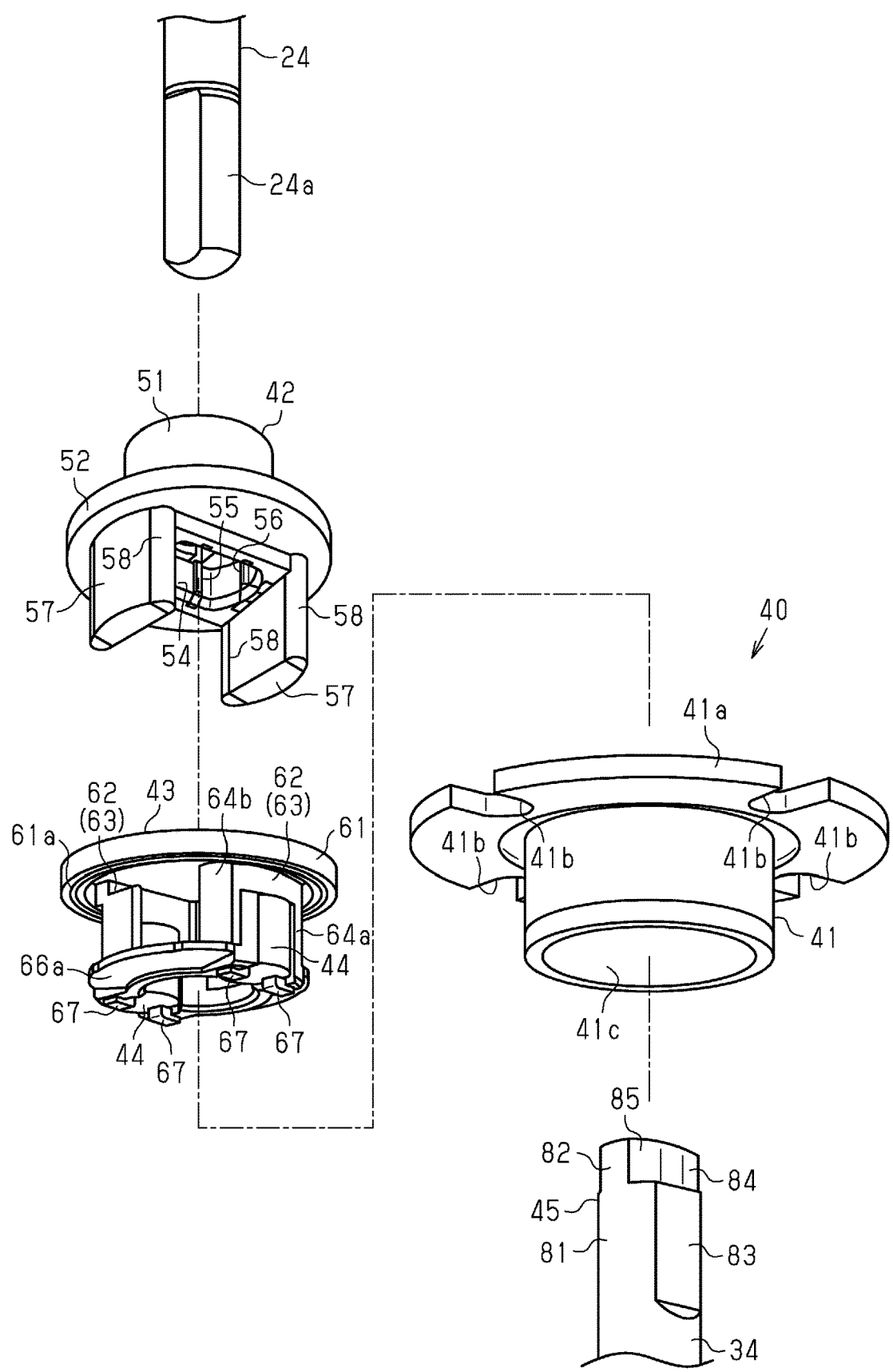
FIG. 3 is an exploded perspective view of an embodiment of a clutch.

As shown in FIGS. 2 and 3, the clutch 40 includes an annular clutch housing 41, a drive-side rotation body 42, a support member 43, rolling elements 44, and a driven-side rotation body 45.

The clutch housing 41 is tubular. A flange-shaped fastening flange 41a extends radially outward from an axial basal end of the clutch housing 41. The outer diameter of the tubular part of the clutch housing 41 is substantially the same as the inner diameter of the clutch receptacle 31c. The outer diameter of the fastening flange 41a is larger than the inner diameter of the clutch receptacle 31c. The fastening flange 41a includes fastening recesses 41b at four positions that are equiangularly separated in the circumferential direction. Each of the fastening recesses 41b extends through the fastening flange 41a in the axial direction and is open radially outward.

As shown in FIG. 2, the clutch housing 41 is inserted into the clutch receptacle 31c from the distal side until the fastening flange 41a comes into contact with the bottom surface of the accommodation recess 31b, and is fastened to the gear housing 31 at the fastening flange 41a. Specifically, fastening projections 31f project in the axial direction from the bottom surface of the accommodation recess 31b around the opening of the clutch receptacle 31c at four positions equiangularly separated in the circumferential direction. The four fastening projections 31f are inserted into the four fastening recesses 41b of the fastening flange 41a in the axial direction. The distal end of each fastening projection 31f is thermally swaged. As a result, the clutch housing 41 is fastened to the gear housing 31 so that the clutch housing 41 cannot move in the axial direction and cannot rotate in the circumferential direction. The clutch housing 41 that is fastened to the gear housing 31 is coaxial with the rotation shaft 24 and the worm shaft 34.

The drive-side rotation body 42 includes a tubular shaft coupling portion 51. The shaft coupling portion 51 is formed integrally with a discoid flange 52 extending radially outward from the outer circumferential surface of the shaft coupling portion 51.

A drive shaft insertion hole 53 axially extends in an axial center of the axial end (upper end in FIG. 2) of the shaft coupling portion 51 located toward the motor unit 20. The drive shaft insertion hole 53 is defined by two parallel flat sections corresponding to the outer shape of the coupling portion 24a of the rotation shaft 24. The shape of two parallel flat sections refers to a shape of an object having a cross section at least having straight lines that are parallel to each other. In an example, two parallel straight lines of a cross section in two parallel flat sections are connected to each other by arcuate curves. When the coupling portion 24a is press-fitted into the drive shaft insertion hole 53, the drive-side rotation body 42 is coupled to the rotation shaft 24 so as to rotate integrally with the rotation shaft 24. The rotation shaft 24 is coaxial with the drive-side rotation body 42 that is coupled to the rotation shaft 24 (i.e., the center axes are aligned with each other).

Also, a driven shaft insertion hole 54 axially extends in an axial center of the axial end (lower end in FIG. 2) of the shaft coupling portion 51 located toward the output unit 30. The center axis of the driven shaft insertion hole 54 coincides with the center axis of the drive shaft insertion hole 53. In the present embodiment, the drive shaft insertion hole 53 is continuous with the driven shaft insertion hole 54.

Figure 6A:
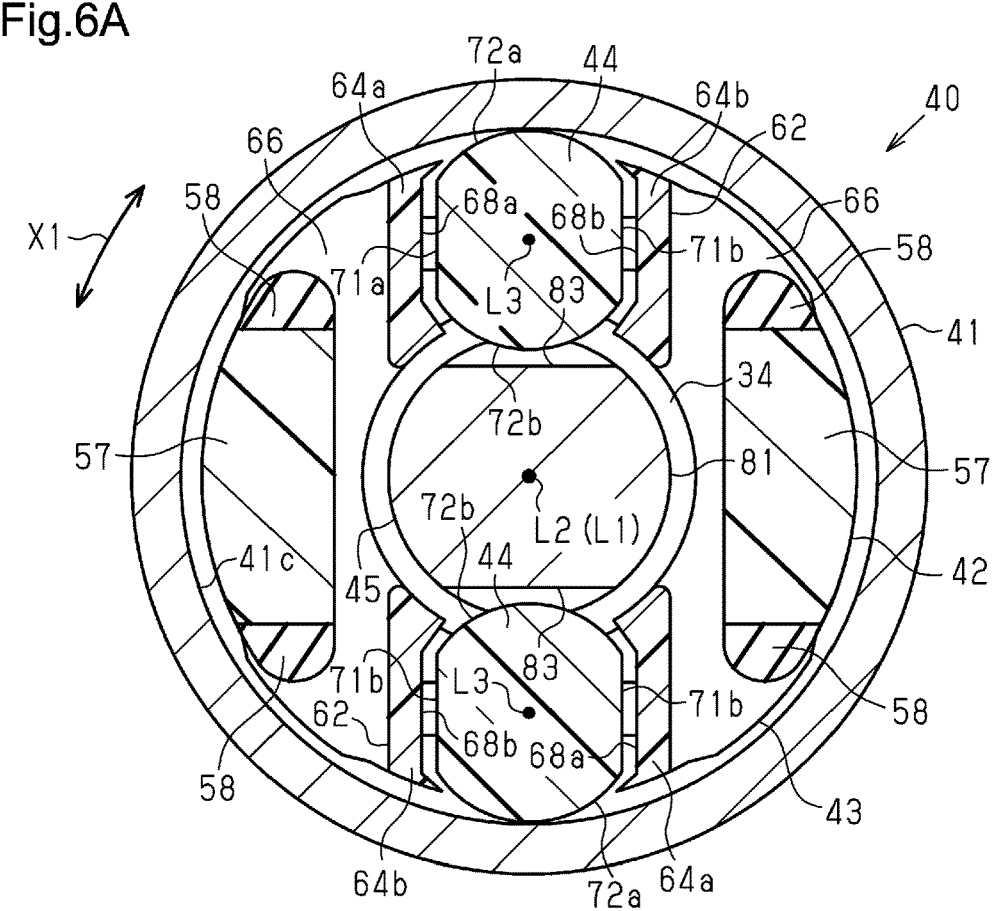
FIG. 6A is a cross-sectional view showing the clutch of the embodiment (cross-sectional view taken along line 6a-6a in FIG. 2)
Figure 6B:
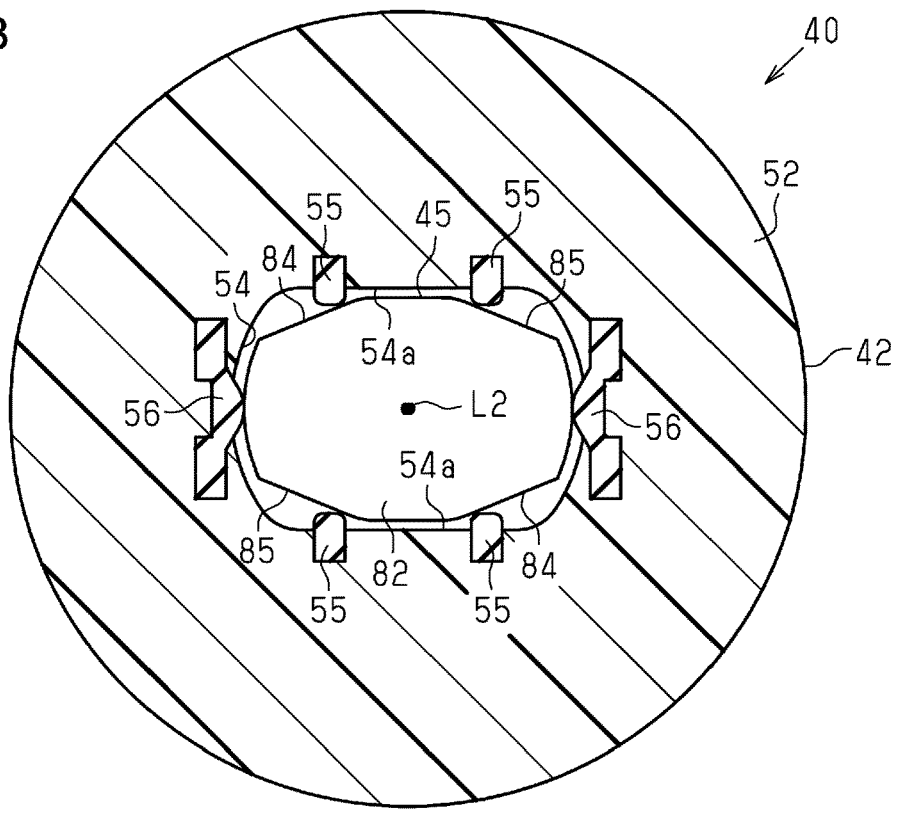
FIG. 6B is a cross-sectional view of the clutch (cross-sectional view taken along line 6a-6a in FIG. 2)

As shown in FIG. 6B, the wall surface of the driven shaft insertion hole 54 includes two drive-side transmission surfaces 54a that are flat and parallel to the axial direction and each other. As viewed in the axial direction, the driven shaft insertion hole 54 has the shape of an athletic field track (two parallel flat sections) so that the long-side direction conforms to a direction parallel to the drive-side transmission surfaces 54a and the short-side direction conforms to a direction orthogonal to the drive-side transmission surfaces 54a. Each drive-side transmission surface 54a is provided with two first elastic members 55 formed from an elastic material such as a rubber material. In axial view, longitudinal opposite ends of the driven shaft insertion hole 54 are each provided with a second elastic member 56 formed from an elastic material such as a rubber material. The first and second elastic members 55 and 56 slightly project inward from the wall surface of the driven shaft insertion hole 54.

As shown in FIGS. 3 and 6A, the drive-side rotation body 42 includes two rolling element releasers 57 extending from the flange 52 toward the output unit 30 (downward in FIG. 3) in the axial direction. In axial view, the rolling element releasers 57 are arranged at opposite sides of the driven shaft insertion hole 54 in the longitudinal direction. The two rolling element releasers 57 are located at positions separated by 180° in a rotation direction and opposed to each other in a radial direction. Opposite circumferential ends of each rolling element releaser 57 include elastic portions 58 formed from an elastic material such as a rubber material. The rolling element releasers 57 are located at an inner side of the clutch housing 41.

As shown in FIGS. 2 and 3, the support member 43 is configured to hold the rolling elements 44 between an inner circumferential surface 41c of the clutch housing 41 and the driven-side rotation body 45, which are opposed to each other in a radial direction. The support member 43 of the present embodiment is formed from resin.

The support member 43 includes a ring 61 that is located at a basal side and is annular about the center axis L2 of the worm shaft 34. The outer diameter of the ring 61 is larger than the inner diameter of the clutch housing 41. The ring 61 is located (upper side in FIG. 2) closer to the motor unit 20 than the fastening flange 41a of the clutch housing 41 and is opposed to the fastening flange 41a in the axial direction.

The ring 61 has a lower surface (axial end surface opposed to the fastening flange 41a) including a lower protrusion 61a that has the shape of an annular protrusion extending in the circumferential direction of the ring 61 and is in contact with the fastening flange 41a in the axial direction. The ring 61 has an upper surface (end surface located toward the drive-side rotation body 42) including an upper projection 61b that projects in the axial direction and is in contact with the flange 52 of the drive-side rotation body 42 in the axial direction.

Rolling element retainers 62 are arranged in two positions separated from each other in the circumferential direction (in the present embodiment, two positions separated by) 180° at a circumferential inner side of the ring 61. The rolling element retainers 62 have the shape of a rod extending in the axial direction and retain the respective rolling elements 44.

Figure 4A:
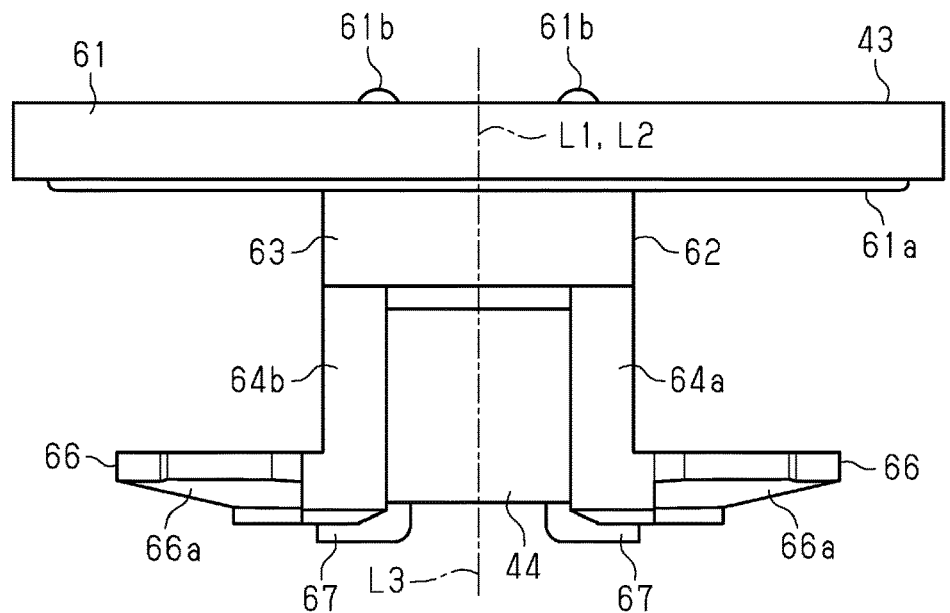
FIG. 4A is a side view of a support member holding a rolling element in the clutch of the embodiment.
Figure 4B:
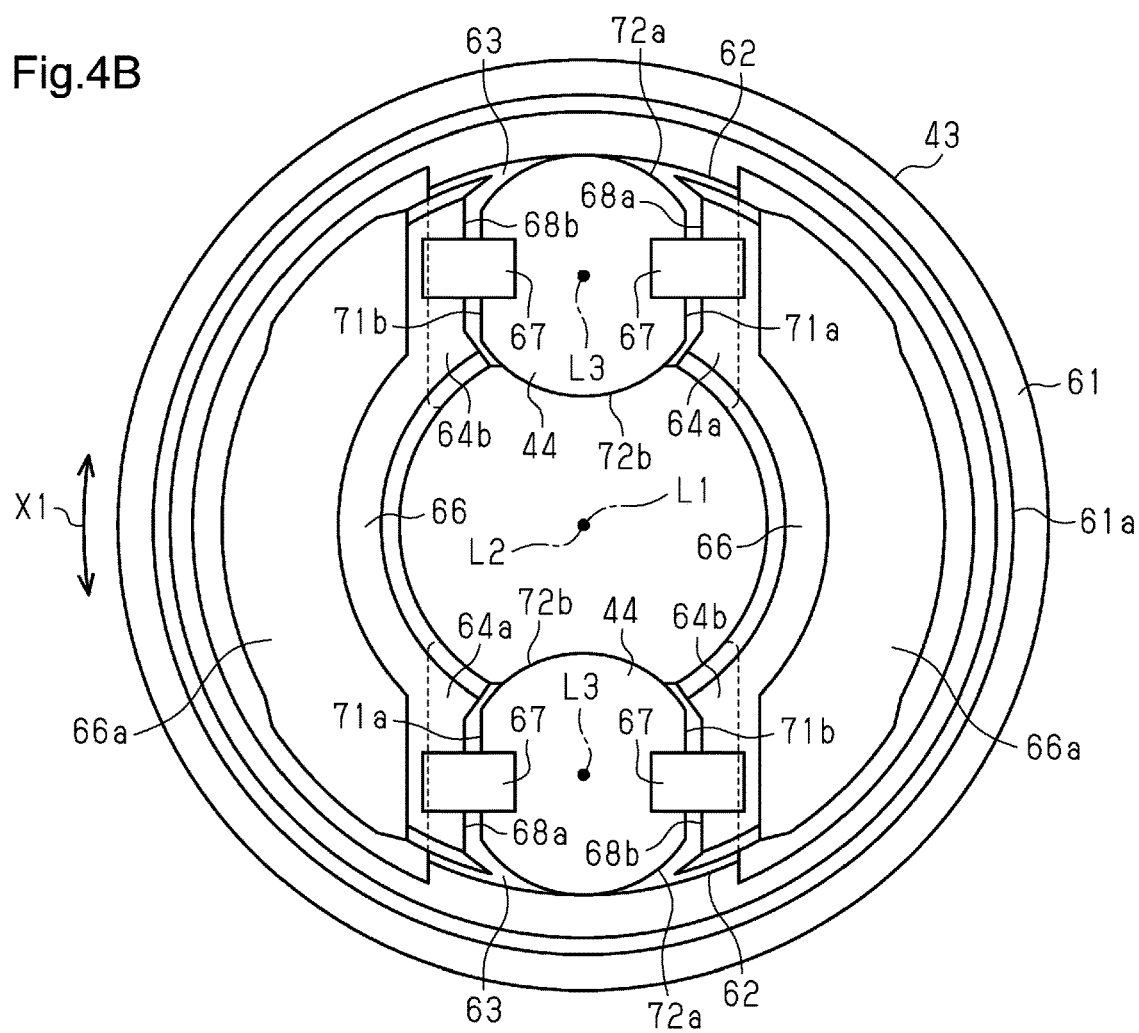
FIG. 4B is a bottom view of the support member.

As shown in FIGS. 4A and 4B, each rolling element 44 is formed from resin and has a center axis L3 extending parallel to the center axis L1 of the rotation shaft 24 and the center axis L2 of the worm shaft 34. In the present embodiment, each rolling element 44 has two parallel flat sections as viewed in the axial direction. Thus, as viewed in the axial direction, the shape of the rolling element 44 has a long-side direction and a short-side direction. In the state shown in FIG. 4B, the radial direction of the clutch 40 conforms to the long-side direction of the rolling element 44, and the circumferential direction of the clutch 40 conforms to the short-side direction of the rolling element 44. Each rolling element 44 includes first and second opposing surfaces 71a and 71b that are flat and located at opposite sides in a rotation direction X1 of the drive-side rotation body 42 (conforming to the circumferential direction of the clutch 40, and hereafter, referred to as rotation direction X1). The rolling element 44 further includes first and second arcuate surfaces 72a and 72b located at opposite sides of the clutch 40 in the radial direction. In the present embodiment, the peripheral surface of the rolling element 44 includes the first and second opposing surfaces 71a and 71b and the first and second arcuate surfaces 72a and 72b.

Figure 5:
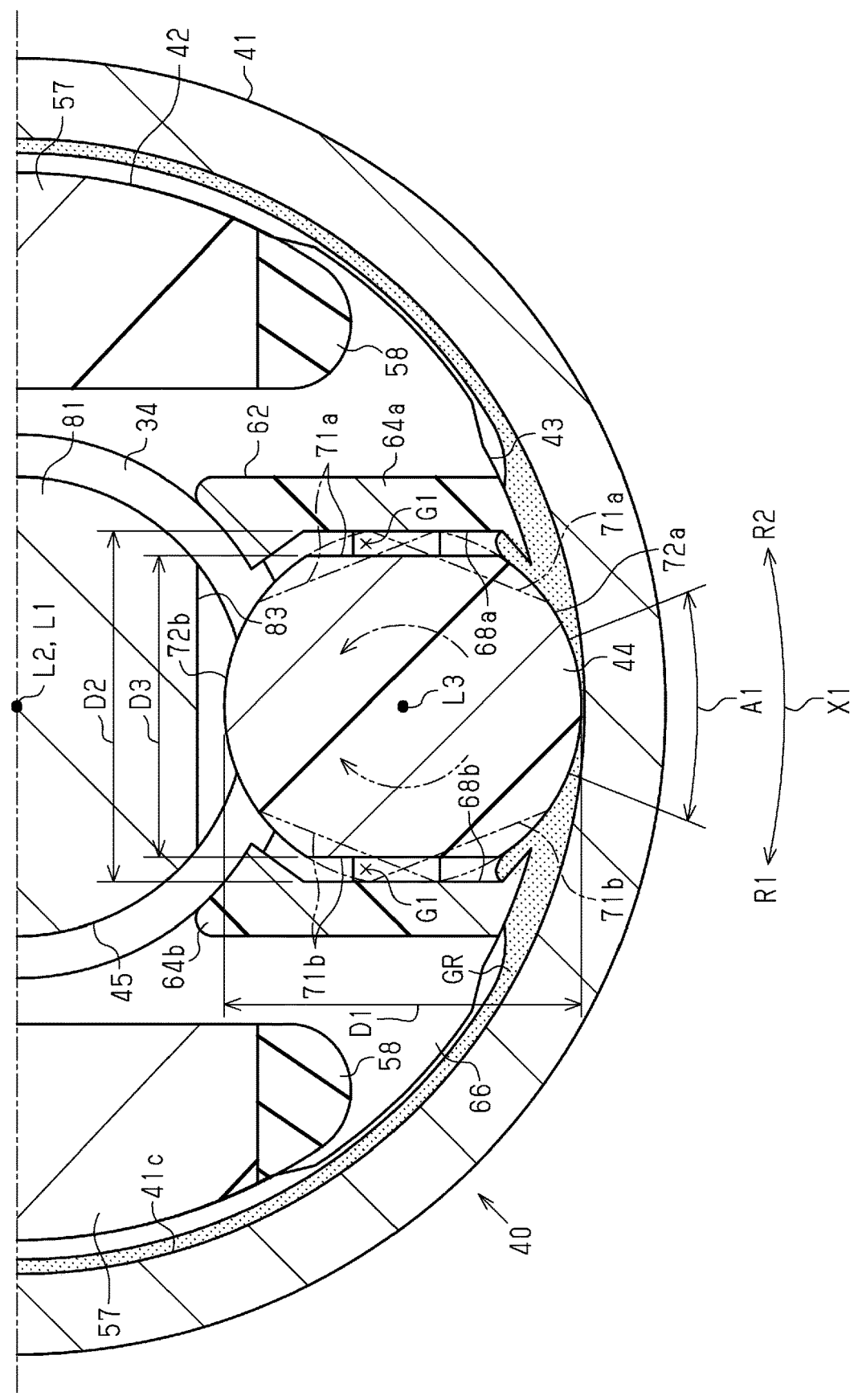
FIG. 5 is a partial enlarged cross-sectional view showing the clutch of the embodiment (cross-sectional view taken along line 6a-6a in FIG. 2)

As shown in FIG. 5, in each rolling element 44, the first and second opposing surfaces 71a and 71b are parallel to the center axis L3 and each other. In the rolling element 44, the first and second arcuate surfaces 72a and 72b have the shape of an arc, the curvature center of which is the center axis L3 as viewed in the axial direction. In the present embodiment, the first and second arcuate surfaces 72a and 72b have the same curvature. The first and second arcuate surfaces 72a and 72b are not inclined and are parallel to the center axis L3. In the rolling element 44, the first arcuate surface 72a is located radially outward and is opposed to the tubular inner circumferential surface 41c of the clutch housing 41 in the radial direction and contactable with the inner circumferential surface 41c. In the rolling element 44, the second arcuate surface 72b is located radially inward and is opposed to the driven-side rotation body 45 in the radial direction and contactable with the driven-side rotation body 45. The axial opposite end surfaces of the rolling element 44 are flat and orthogonal to the first and second opposing surfaces 71a and 71b (refer to FIG. 4A).

As shown in FIGS. 3, 4A, and 4B, each rolling element retainer 62 includes an axial support portion 63 extending radially inward from the ring 61. The axial support portion 63 is opposed to the rolling element 44 in the axial direction. The rolling element retainer 62 further includes two roller supports 64a and 64b extending from circumferential opposite ends of the axial support portion 63 away from the ring 61 (downward in FIG. 4A) in the axial direction (direction of the center axes L1 and L2). In the rolling element retainer 62, the paired roller supports 64a and 64b are located at opposite sides of the rolling element 44 in the rotation direction X1 and support the rolling element 44 from the opposite sides in the rotation direction X1 so that the center axis L3 extends parallel to the center axis L1. When the clutch 40 is viewed from the motor unit 20 in the axial direction (that is, the state shown in FIG. 6A), in the roller supports 64a and 64b paired in the rolling element retainer 62, the one located at a counterclockwise side of the rolling element 44 is referred to as a first roller support 64a, and the one located at a clockwise side of the rolling element 44 is referred to as a second roller support 64b.

The support member 43 further includes coupling portions 66, each of which couples the distal end of the first roller support 64a of one rolling element retainer 62 to the distal end of the second roller support 64b of the other rolling element retainer 62. The coupling portions 66 are arcuate about the center axes L1 and L2 in axial view. The distal end of each of the roller supports 64a and 64b has a holding hook 67 projecting between the first and second roller supports 64a and 64b that are paired with each other. Each holding hook 67 is in contact with an axial end surface of the rolling element 44 to prevent separation of the rolling element 44 from the rolling element retainer 62 in the axial direction.

As shown in FIGS. 4B and 5, in each rolling element retainer 62, the paired roller supports 64a and 64b have side surfaces opposed to each other in the rotation direction X1 including first and second contact surfaces 68a and 68b, respectively. The first contact surface 68a of the first roller support 64a is flat and parallel to the center axes L1 and L2 and is opposed to the first opposing surface 71a of the rolling element 44 located between the paired roller supports 64a and 64b. In the same manner as the first contact surface 68a, the second contact surface 68b of the second roller support 64b is flat and parallel to the center axes L1 and L2 and is opposed to the second opposing surface 71b of the rolling element 44 located between the paired roller supports 64a and 64b. The first and second opposing surfaces 71a and 71b opposed in the rotation direction X1 are parallel to each other. The first and second contact surfaces 68a and 68b are longer in the axial direction than the rolling element 44 (first and second opposing surfaces 71a and 71b). The radial width of the clutch 40 in the first and second contact surfaces 68a and 68b is greater than or equal to the radial width of the clutch 40 in the first and second opposing surfaces 71a and 71b.

The rolling element 44 has a maximum diameter D1 (i.e., longitudinal dimension of the rolling element 44 in axial view) that is greater than a distance D2 between the first contact surface 68a and the second contact surface 68b of the rolling element retainer 62. The distance D2 of the rolling element retainer 62 is greater than a dimension D3 of the rolling element 44 in the rotation direction X1 (in the present embodiment, the distance between the first opposing surface 71a and the second opposing surface 71b, or the dimension of the rolling elements 44 in the short-side direction in axial view). Therefore, the paired roller supports 64a and 64b are spaced apart from the rolling element 44 located between the roller supports 64a and 64b by an allowance gap G1 that determines a range in which the rolling element 44 rotates about the center axis L3. Thus, rotation of the rolling element 44 about the center axis L3 is restricted by the paired roller supports 64a and 64b.

As shown in FIG. 5, as viewed from the motor unit 20 in the axial direction, when the rolling element 44 is rotated counterclockwise about the center axis L3 between the paired roller supports 64a and 64b, the rolling element 44 comes into contact with the first contact surface 68a via the end of the first opposing surface 71a located toward the first arcuate surface 72a as indicated by the single-dashed lines. Also, the rolling element 44 comes into contact with the second contact surface 68b via the end of the second opposing surface 71b located toward the second arcuate surface 72b. As viewed from the motor unit 20 in the axial direction, when the rolling element 44 is rotated clockwise about the center axis L3 between the paired roller supports 64a and 64b, the rolling element 44 comes into contact with the first contact surface 68a via the end of the first opposing surface 71a located toward the second arcuate surface 72b as indicated by the double-dashed lines. Also, the rolling element 44 comes into contact with the second contact surface 68b via the end of the second opposing surface 71b located toward the first arcuate surface 72a. Thus, the restriction of rotation of the rolling element 44 about the center axis L3 by the paired roller supports 64a and 64b determines a slide range A1 in which the peripheral surface of the rolling element 44 is slidable on the inner circumferential surface 41c of the clutch housing 41.

As shown in FIGS. 2 and 6A, when the support member 43 configured as described above holds the two rolling elements 44, the two rolling elements 44 are separated by an equiangular distance (in the present embodiment, 180° distance) in the rotation direction X1. The roller supports 64a and 64b that hold the rolling elements 44 are inserted into the clutch housing 41. Thus, the rolling elements 44 are opposed to the clutch housing 41 inside the clutch housing 41. In addition, in each rolling element 44, the portion of the first arcuate surface 72a corresponding to the slide range A1 (refer to FIG. 5) is contactable with the inner circumferential surface 41c of the clutch housing 41 between the paired roller supports 64a and 64b. The support member 43 is configured to rotate relative to the clutch housing 41 in the rotation direction X1.

The rolling element releasers 57 of the drive-side rotation body 42 are inserted into the clutch housing 41 through an inner circumferential side of the ring 61 of the support member 43. Each rolling element releaser 57 is located between the two rolling element retainers 62 and adjacent to the rolling element retainers 62 in the circumferential direction. Thus, opposite ends (elastic portions 58) of the rolling element releaser 57 in the rotation direction X1 are opposed to the first roller support 64a of one rolling element retainer 62 and the second roller support 64b of the other rolling element retainer 62 in the rotation direction X1. The support member 43 and the drive-side rotation body 42 are configured to rotate relative to each other in the rotation direction X1. When the drive-side rotation body 42 rotates, the rolling element releasers 57 come into contact with the roller supports 64a and 64b located forward in the rotation direction.

As shown in FIGS. 2 and 3, the driven-side rotation body 45 is formed integrally with the basal end (upper end in FIG. 2) of the worm shaft 34 and is formed of metal. The driven-side rotation body 45 includes a control portion 81 and a driven-side coupling portion 82 located next to each other in the axial direction. The driven-side coupling portion 82 is arranged at a basal side (upper side in FIG. 2) of the control portion 81.

The control portion 81 is formed integrally with the worm shaft 34 and is rod-shaped and extends in an axial direction of the worm shaft 34. The center axis of the control portion 81 coincides with the center axis L2 of the worm shaft 34, so that the control portion 81 is coaxial with the worm shaft 34. As shown in FIG. 6A, as viewed in a direction of the center axis L2, the control portion 81 has a point-symmetric shape about the center axis L2 of the worm shaft 34.

The peripheral surface of the control portion 81 includes two control surfaces 83. The control surfaces 83 are formed in two positions of the peripheral surface of the control portion 81 that are separated by an equiangular distance (in the present embodiment, 180° distance). The control surfaces 83 are flat and parallel to the axial direction and orthogonal to a radial direction of the driven-side rotation body 45. The two control surfaces 83 are parallel to each other. Each control surface 83 is longer than the rolling elements 44 in the axial direction.

As shown in FIGS. 2 and 6B, the driven-side coupling portion 82 is rod-shaped and extends in the axial direction of the worm shaft 34. The center axis of the driven-side coupling portion 82 coincides with the center axis L2 of the worm shaft 34, so that the driven-side coupling portion 82 is coaxial with the worm shaft 34. The driven-side coupling portion 82 is slightly thinner than the driven shaft insertion hole 54. The driven-side coupling portion 82 has an elliptical cross section that is orthogonal to the axial direction. The cross-sectional shape is uniform in the axial direction. In axial view, the long-side direction of the driven-side coupling portion 82 is parallel to the control surfaces 83, and the short-side direction of the driven-side coupling portion 82 is orthogonal to the control surfaces 83 (also refer to FIG. 6A). As shown in FIG. 6B, as viewed in the direction of the center axis L2, the driven-side coupling portion 82 has a point-symmetric shape about the center axis L2 of the worm shaft 34.

The peripheral surface of the driven-side coupling portion 82 includes two first driven-side transmission surfaces 84 and two second driven-side transmission surfaces 85. In the two first driven-side transmission surfaces 84, one of the first driven-side transmission surfaces 84 is located at a 180° opposite side of the other of the first driven-side transmission surfaces 84. The two first driven-side transmission surfaces 84 are flat and parallel to the axial direction and each other. The distance between the first driven-side transmission surfaces 84 is equal to the distance between the two drive-side transmission surfaces 54a of the drive-side rotation body 42 in the driven shaft insertion hole 54.

The second driven-side transmission surfaces 85 are arranged between the two first driven-side transmission surfaces 84. One of the second driven-side transmission surfaces 85 is located at a 180° opposite side of the other of the second driven-side transmission surfaces 85. The two second driven-side transmission surfaces 85 are flat and parallel to the axial direction and each other. The distance between the second driven-side transmission surfaces 85 is equal to the distance between the two drive-side transmission surfaces 54a of the drive-side rotation body 42 in the driven shaft insertion hole 54. The first driven-side transmission surfaces 84 and the second driven-side transmission surfaces 85 extend from one end to the other end of the driven-side coupling portion 82 in the axial direction.

As shown in FIG. 2, the driven-side rotation body 45 described above is inserted into the clutch housing 41 and the support member 43 from the opposite side with respect to the drive-side rotation body 42. The driven-side rotation body 45 is coaxial with the clutch housing 41, the drive-side rotation body 42, and the support member 43.

As shown in FIG. 6B, the driven-side coupling portion 82 is loosely fit into the driven shaft insertion hole 54 and is configured to rotate integrally with the drive-side rotation body 42. The first and second elastic members 55 and 56 are arranged between the driven-side coupling portion 82, which is loosely fit into the driven shaft insertion hole 54, and the driven shaft insertion hole 54. More specifically, the two second elastic members 56 are in contact with the longitudinal opposite ends of the driven-side coupling portion 82 in axial view. The four first elastic members 55 are arranged between the drive-side transmission surfaces 54a and each of the two first driven-side transmission surfaces 84 and the two second driven-side transmission surfaces 85.

When the drive-side rotation body 42 is rotated about the center axis relative to the driven-side rotation body 45, the drive-side transmission surfaces 54a elastically deform the first elastic members 55 and come into contact with one of the first and second driven-side transmission surfaces 84 and 85. As a result, the drive-side rotation body 42 engages with the driven-side rotation body 45 in the rotation direction, and rotational drive force of the drive-side rotation body 42 is transmitted to the driven-side rotation body 45.

As shown in FIG. 6A, the control portion 81 of the driven-side rotation body 45 is inserted into the support member 43 so that the rolling elements 44 are located between the inner circumferential surface 41c of the clutch housing 41 and the respective control surfaces 83. The control portion 81 of the driven-side rotation body 45 is radially opposed to the clutch housing 41 and the rolling elements 44. More specifically, the support member 43 holds the rolling elements 44 between the inner circumferential surface 41c of the clutch housing 41 and the respective control surfaces 83 of the driven-side rotation body 45.

The distance between each control surface 83 and the inner circumferential surface 41c of the clutch housing 41 (gap in a direction orthogonal to the control surface 83) changes in the rotation direction of the driven-side rotation body 45. In the present embodiment, the distance between the control surface 83 and the inner circumferential surface 41c of the clutch housing 41 is greatest at a circumferential center of the control surface 83 and gradually decreases from the circumferential center toward circumferential opposite ends of the control surface 83. The distance between the circumferential center of the control surface 83 and the inner circumferential surface 41c of the clutch housing 41 is greater than the maximum diameter D1 (refer to FIG. 5) of the rolling element 44. The distance between each circumferential end of the control surface 83 and the inner circumferential surface 41c of the clutch housing 41 is less than the maximum diameter D1 of the rolling element 44.

As shown in FIG. 5, in the clutch 40 of the present embodiment, grease GR is applied to the inner circumferential surface 41c of the clutch housing 41. The grease GR also fills a space between the inner circumferential surface 41c of the clutch housing 41 and the first arcuate surfaces 72a of the rolling elements 44. When the rotation shaft 24 is not driven to rotate (that is, when the drive-side rotation body 42 is not driven to rotate), the grease GR increases the sliding friction between the inner circumferential surface 41c of the clutch housing 41 and the rolling elements 44. FIG. 5 schematically shows the portion in which the grease GR is located. The drawings other than FIG. 5 do not show the grease GR.

In the present embodiment, the distal surface of the support member 43 includes inclined portions 66a corresponding to a guide configured to guide the grease GR that is unevenly applied to the inner circumferential surface 41c of the clutch housing 41 to be evenly applied to the inner circumferential surface 41c of the clutch housing 41 when inserted into the clutch housing 41.

More specifically, as shown in FIGS. 4A and 4B, the inclined portions 66a are formed on the distal surface of the coupling portions 66. Each inclined portion 66a is inclined toward the basal side (upper side in FIG. 4A) from the axial center (center axes L1 and L2) toward a radially outer side. The inclined portion 66a is inclined at an angle so that the radial outer end of the inclined portion 66a is located at a basal side of (upper side in FIG. 4A) the lower surface of the rolling element 44. The inclined portion 66a is arranged on a substantially entire region of the part of coupling portion 66 that is not provided with the holding hook 67.

The inclined portion 66a guides the grease GR that is unevenly applied to the inner circumferential surface 41c of the clutch housing 41 so that radial inward movement of the grease GR on the distal surface of the coupling portion 66 is hampered when inserted into the clutch housing 41. Also, when inserted into the clutch housing 41, the inclined portion 66a guides the grease GR that is unevenly applied to the inner circumferential surface 41c of the clutch housing 41 and protruding radially inward from the inner circumferential surface 41c so that the grease GR moves toward the inner circumferential surface 41c of the clutch housing 41. In addition, when the support member 43 is inserted into the clutch housing 41, the inclined portion 66a guides the grease GR that is applied to a basal side of the inner circumferential surface 41c of the clutch housing 41 to spread to a distal side of the inner circumferential surface 41c of the clutch housing 41.

Figure 7A:
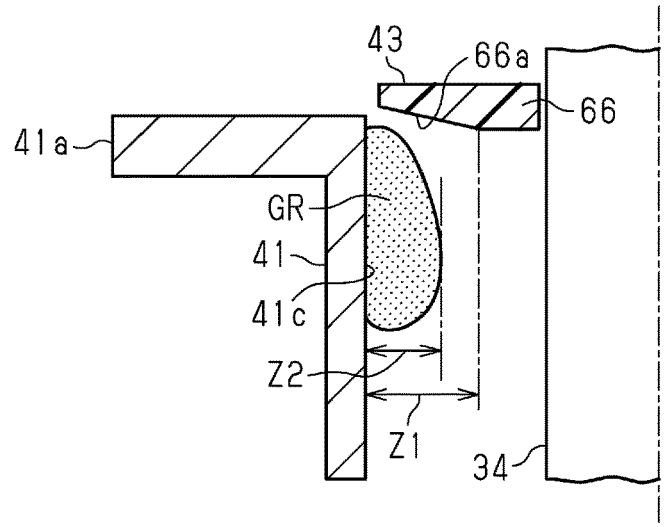
FIGS. 7A, 7B, and 7C are partial schematic cross-sectional views showing a method for manufacturing a clutch.
Figure 7B:
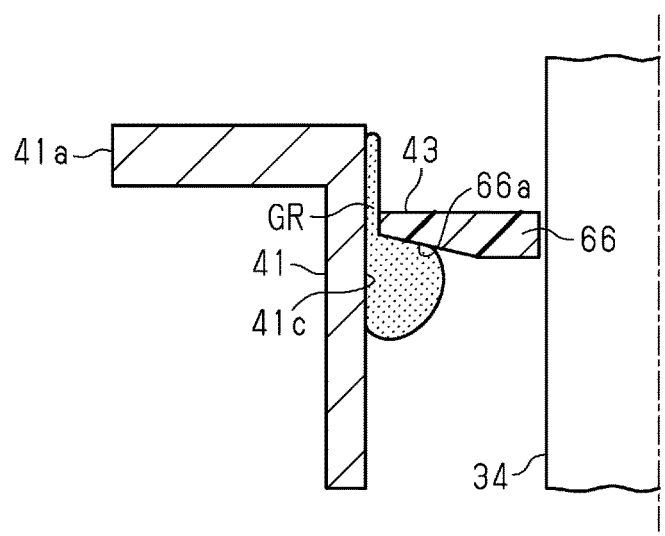
Figure 7C:
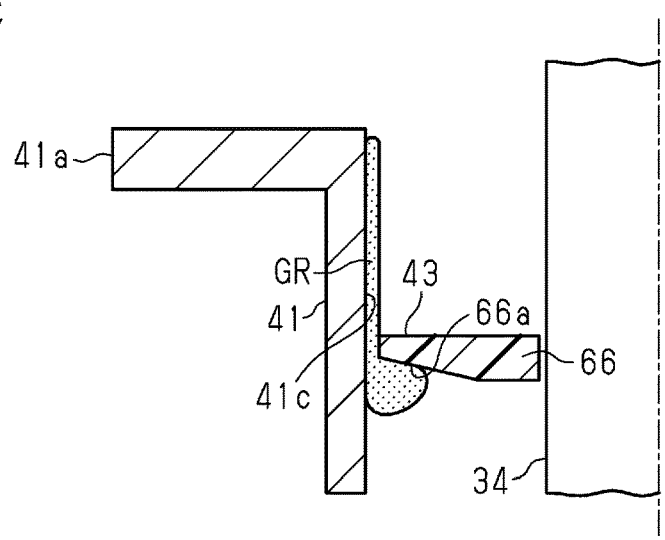

As schematically shown in FIGS. 7A to 7C, a method for manufacturing the clutch 40 of the present embodiment includes an "applying step" and an "inserting step."

As shown in FIG. 7A, in the applying step, prior to insertion of the support member 43 into the clutch housing 41, the grease GR is applied to the basal side (upper side in FIG. 7A) of the inner circumferential surface 41c of the clutch housing 41. In the applying step, the grease GR is applied to the inner circumferential surface 41c of the clutch housing 41 along the entire perimeter. In the applying step, the grease GR is applied so that the basal end (upper end in FIG. 7A) of the grease GR is located at a basal side (upper side in FIG. 7A) of the basal end of the inner circumferential surface 41c of the clutch housing 41 in an axial range opposed to the rolling elements 44 (refer to FIG. 2). In other words, the grease GR is applied so that the basal end (upper end in FIG. 7A) of the grease GR is located between the basal end of the inner circumferential surface 41c of the clutch housing 41 in the axial range opposed to the rolling elements 44 (refer to FIG. 2) and the basal end (upper end in FIG. 7A) of the clutch housing 41. In addition, as schematically shown in FIG. 7A, the inclined portion 66a is set so that a radial distance Z1 from the inner circumferential surface 41c of the clutch housing 41 to the radially inner end of the inclined portion 66a is greater than a radial distance Z1 from the inner circumferential surface 41c of the clutch housing 41 to the radially inner end of the grease GR applied to the inner circumferential surface 41c. In other words, in the applying step, the grease GR is applied to the inner circumferential surface 41c of the clutch housing 41 so that the radial distance Z2 from the inner circumferential surface 41c of the clutch housing 41 to the radially inner end of the grease GR is less than the radial distance Z1 from the inner circumferential surface 41c of the clutch housing 41 to the radially inner end of the inclined portion 66a.

As shown in FIGS. 7B and 7C, in the inserting step performed after the applying step, the support member 43 is inserted into the clutch housing 41, so that the grease GR spreads to the distal side (lower side in FIGS. 7A to 7C) of the inner circumferential surface 41c of the clutch housing 41. At this time, the grease GR is guided and is evenly applied to the inner circumferential surface 41c of the clutch housing 41 by the operation of the inclined portion 66a. Subsequent to the inserting step, for example, after the manufacturing of the motor 10 is completed, when the motor 10 is driven to rotate the support member 43, the residual grease GR on the inclined portions 66a is directed to the inner circumferential surface 41c of the clutch housing 41 by centrifugal force.

Actions of the motor 10 having the configuration described above and its operation will be described focusing on actions of the clutch 40.

Figure 8A:
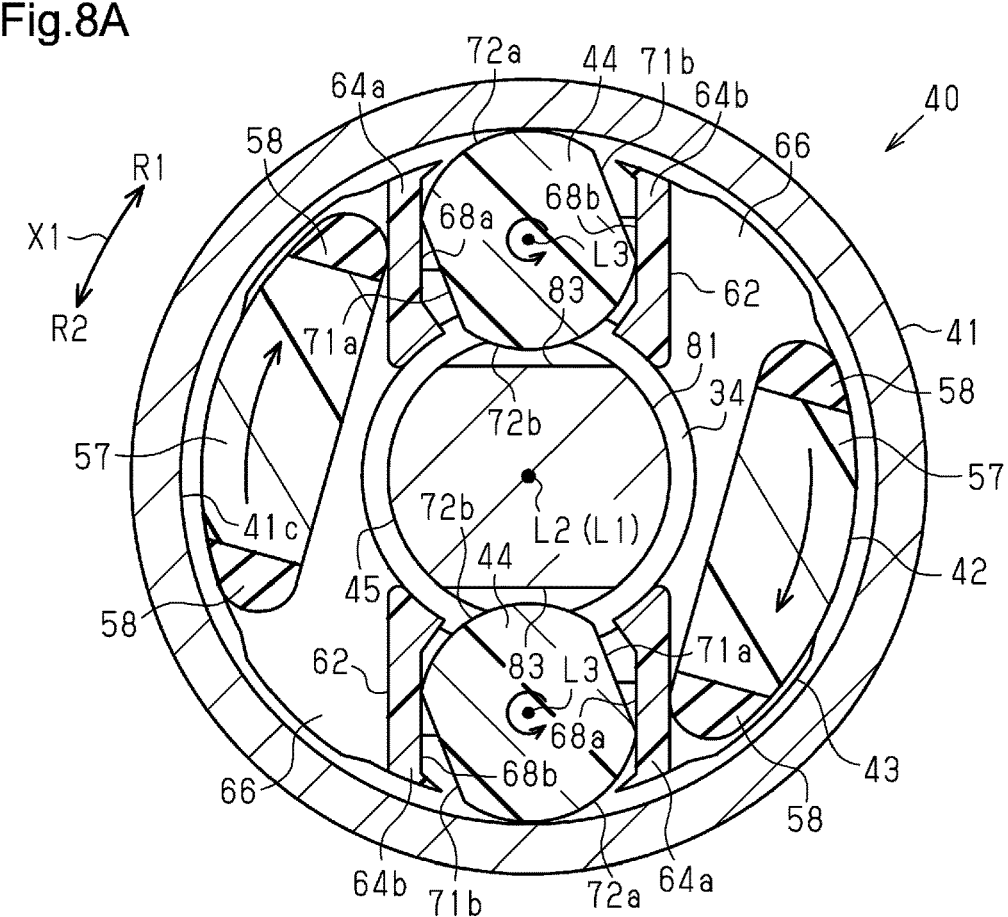
FIGS. 8A and 8B are cross-sectional views showing actions of the clutch of the embodiment.
Figure 8B:
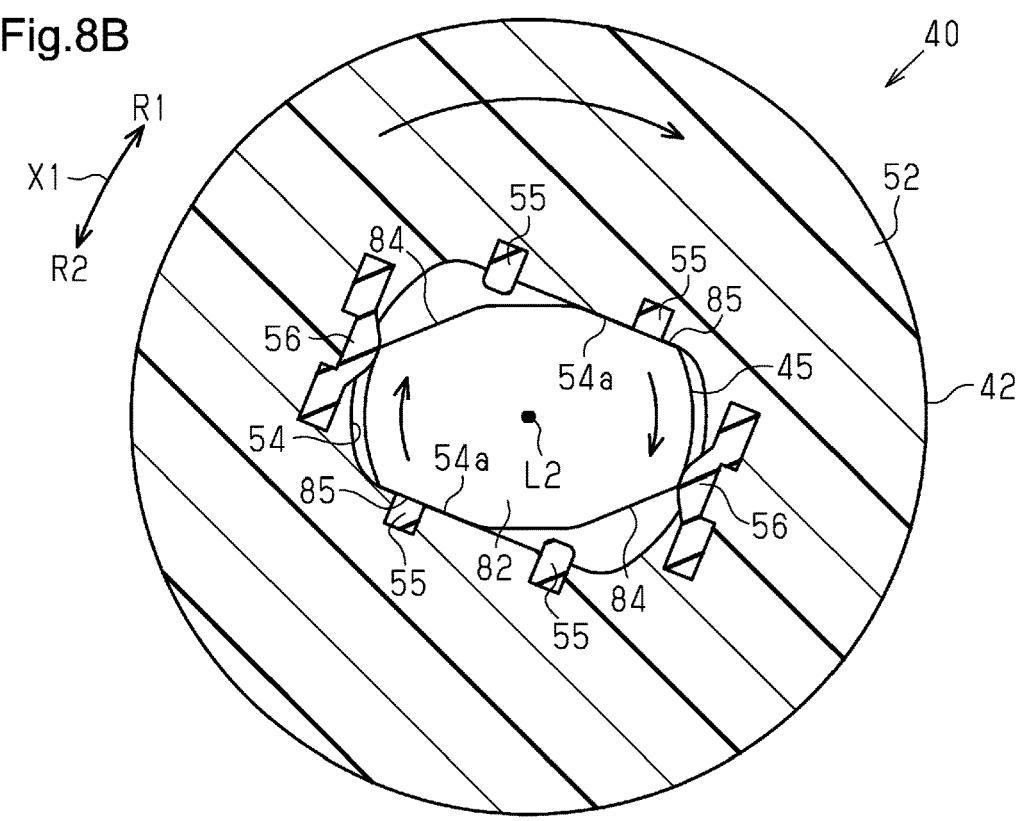

As shown in FIGS. 2 and 8A, when the motor unit 20 is energized and driven, the drive-side rotation body 42 rotates together with the rotation shaft 24. That is, the drive-side rotation body 42 is driven to rotate. FIGS. 8A and 8B show a case in which the drive-side rotation body 42 is driven to rotate in a first direction R1. As shown in FIG. 8A, as the drive-side rotation body 42 rotates in the first direction R1, the circumferential end (elastic portion 58) of each rolling element releaser 57 of the drive-side rotation body 42 located forward in the rotation direction comes into contact with the first roller support 64a of the corresponding one of the rolling element retainers 62 and pushes the first roller support 64a and the rolling element 44 in the first direction R1. As a result, the rolling elements 44 are located at the circumferential center of the respective control surfaces 83 of the driven-side rotation body 45. More specifically, the rolling elements 44 enter an unlocked state in which the rolling elements 44 are not held between the clutch housing 41 and the control surfaces 83 (that is, the rolling elements 44 do not interfere with rotation of the driven-side rotation body 45).

In the unlocked state, as shown in FIG. 8B, the drive-side transmission surfaces 54a of the drive-side rotation body 42 come into contact with the second driven-side transmission surfaces 85 of the driven-side coupling portion 82 in the first direction R1, so that the drive-side rotation body 42 and the driven-side rotation body 45 are coupled so as to rotate integrally with each other in the rotation direction X1. As a result, rotational drive force of the drive-side rotation body 42 (rotation shaft 24) is transmitted to the driven-side rotation body 45 (worm shaft 34), and the rotation shaft 24 and the worm shaft 34 integrally rotate in the first direction R1.

At this time, as shown in FIGS. 5 and 8A, as the first roller supports 64a are pushed by the rolling element releasers 57 in the first direction R1, the support member 43 and the rolling elements 44 rotate together with the drive-side rotation body 42 and the driven-side rotation body 45 about the rotation axis (same as the center axis L1) of the drive-side rotation body 42. Then, a frictional force between the inner circumferential surface 41c of the clutch housing 41 and the rolling elements 44 causes the rolling elements 44 to rotate between the paired roller supports 64a and 64b in the opposite direction with respect to the rotation direction of the support member 43 about the center axis L3. When the rolling elements 44 are rotated about the center axis L3 by an amount allowed by the allowance gap G1 between the roller supports 64a and 64b, opposite sides of the rolling elements 44 in the rotation direction X1 come into contact with the roller supports 64a and 64b. In the present embodiment, when the drive-side rotation body 42 is rotated in the first direction R1, each rolling element 44 comes into contact with the first contact surface 68a via the end of the first opposing surface 71a located toward the first arcuate surface 72a and comes into contact with the second contact surface 68b via the end of the second opposing surface 71b located toward the second arcuate surface 72b. Thus, the support member 43 restricts the rotation of the rolling elements 44 about the center axis L3. Even when the drive-side rotation body 42 is driven to rotate and the rolling elements 44 are rotated together with the drive-side rotation body 42 about the rotation axis of the drive-side rotation body 42, the rolling elements 44 are rotated about the center axis L3 in only the range allowed by the support member 43.

Rotation of the worm shaft 34 in the first direction R1 is reduced in speed between the worm shaft 34 and the worm wheel 37 and is transmitted to the output shaft 38 and output from the output shaft 38. In accordance with the rotation direction of the output shaft 38, the vehicle window glass is raised and lowered via the window regulator, which is not shown in the drawings. When the energization to the motor unit 20 is stopped, the driving and rotation of the rotation shaft 24 is stopped, that is, the driving and rotation of the drive-side rotation body 42 is stopped.

Figure 9A:
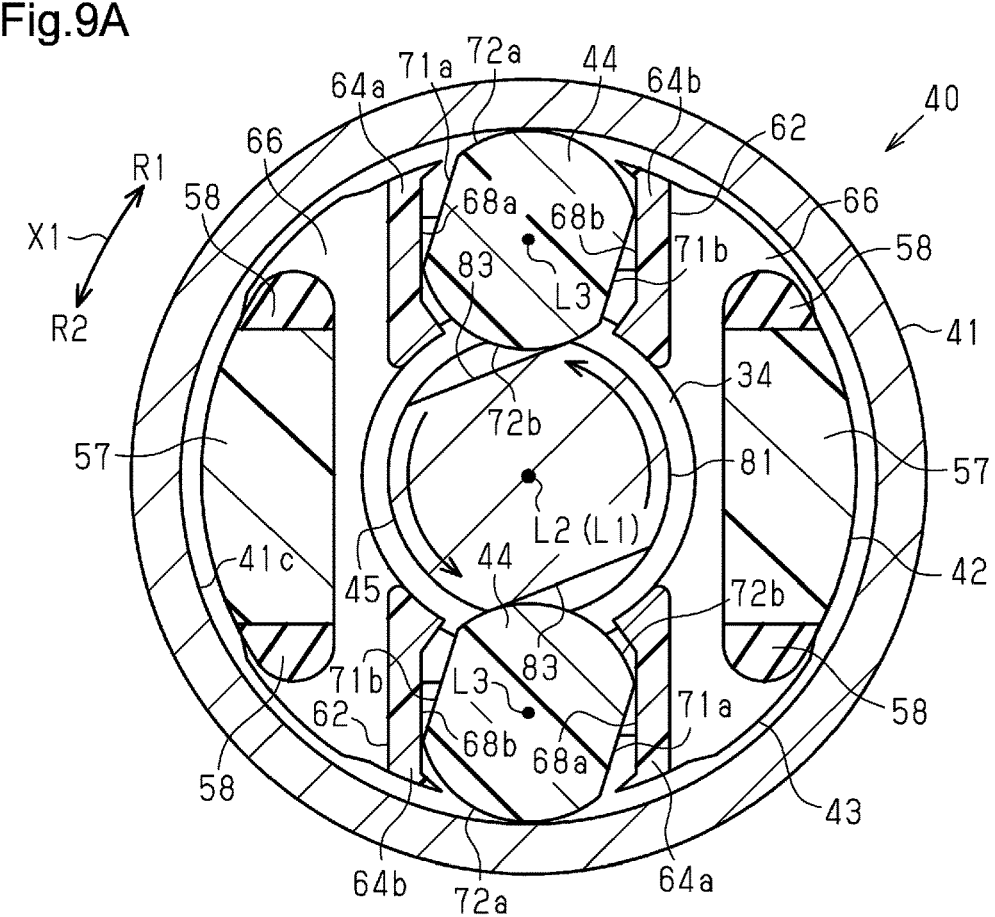
FIGS. 9A and 9B are cross-sectional views showing actions of the clutch of the embodiment.
Figure 9B:
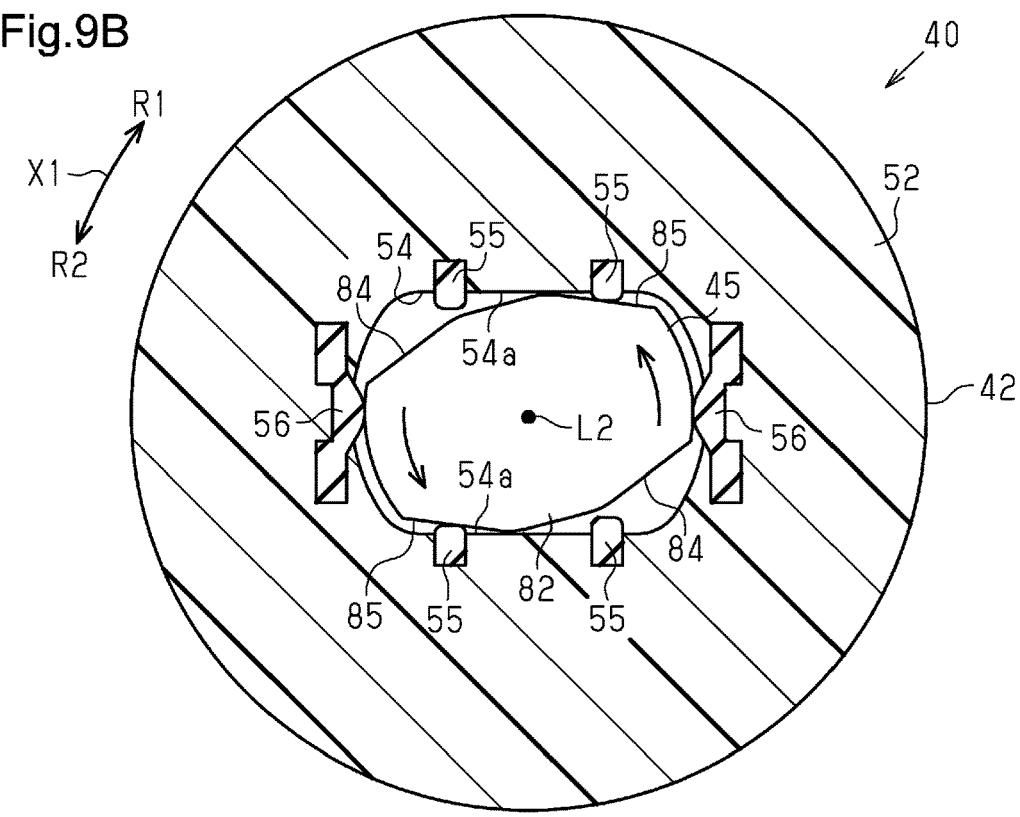

As shown in FIGS. 9A and 9B, in a state in which the driving of the motor unit 20 is stopped, that is, when the rotation shaft 24 (drive-side rotation body 42) is not driven to rotate, when a load is applied to the output shaft 38 from the load side (window regulator side in the present embodiment), the load causes the driven-side rotation body 45 to try to rotate. FIGS. 9A and 9B show a case in which the driven-side rotation body 45 tries to rotate in a second direction R2. The control surfaces 83 of the driven-side rotation body 45 push the rolling elements 44, which are located between the inner circumferential surface 41c of the clutch housing 41 and the control surfaces 83, to a circumferentially outer side. In each rolling element 44 pushed by the control surface 83, the first arcuate surface 72a comes into contact with the inner circumferential surface 41c of the clutch housing 41 between the paired roller supports 64a and 64b, and the second arcuate surface 72b comes into contact with a portion of the control surface 83 located closer to the circumferential end (end of the control surfaces 83 located rearward in the second direction R2) than the circumferential center of the control surface 83. The rolling element 44 is held between the inner circumferential surface 41c of the clutch housing 41 and the portion of the control surface 83 located toward the rearward end in the second direction R2. As a result, the rolling elements 44 act as wedges and hamper the rotation (in the second direction R2) of the driven-side rotation body 45 (i.e., lock rotation of the worm shaft 34). Thus, when the rotation shaft 24 (drive-side rotation body 42) is not driven to rotate, rotation of the output shaft 38 is hampered. When the driven-side rotation body 45 is located in the lock position (position in which the rolling elements 44 are held between the driven-side rotation body 45 and the clutch housing 41) (state shown in FIG. 9A), as shown in FIG. 9B, the second driven-side transmission surfaces 85 of the driven-side coupling portion 82 are configured not to contact the drive-side transmission surfaces 54a of the drive-side rotation body 42 in the rotation direction (second direction R2).

Furthermore, when the motor unit 20 (drive-side rotation body 42) is not driven to rotate and the driven-side rotation body 45 tries to rotate in the first direction R1, rotation of the driven-side rotation body 45 is hampered in the same manner. More specifically, when each rolling element 44 is held between the inner circumferential surface 41c of the clutch housing 41 and a portion of the control surface 83 located toward a rearward end in the first direction R1, the rolling element 44 acts as a wedge and hampers the rotation (in the first direction R1) of the driven-side rotation body 45 (i.e., locks rotation of the worm shaft 34).

Figure 10A:
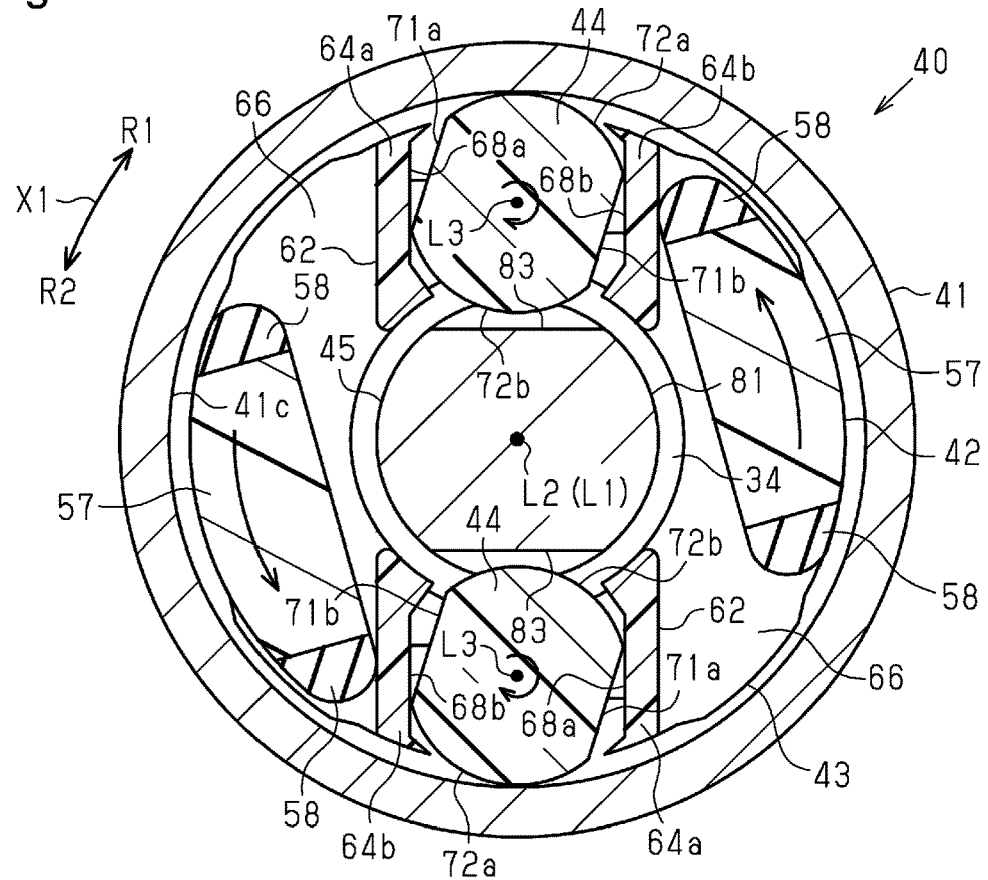
FIGS. 10A and 10B are cross-sectional views showing actions of the clutch of the embodiment.
Figure 10B:
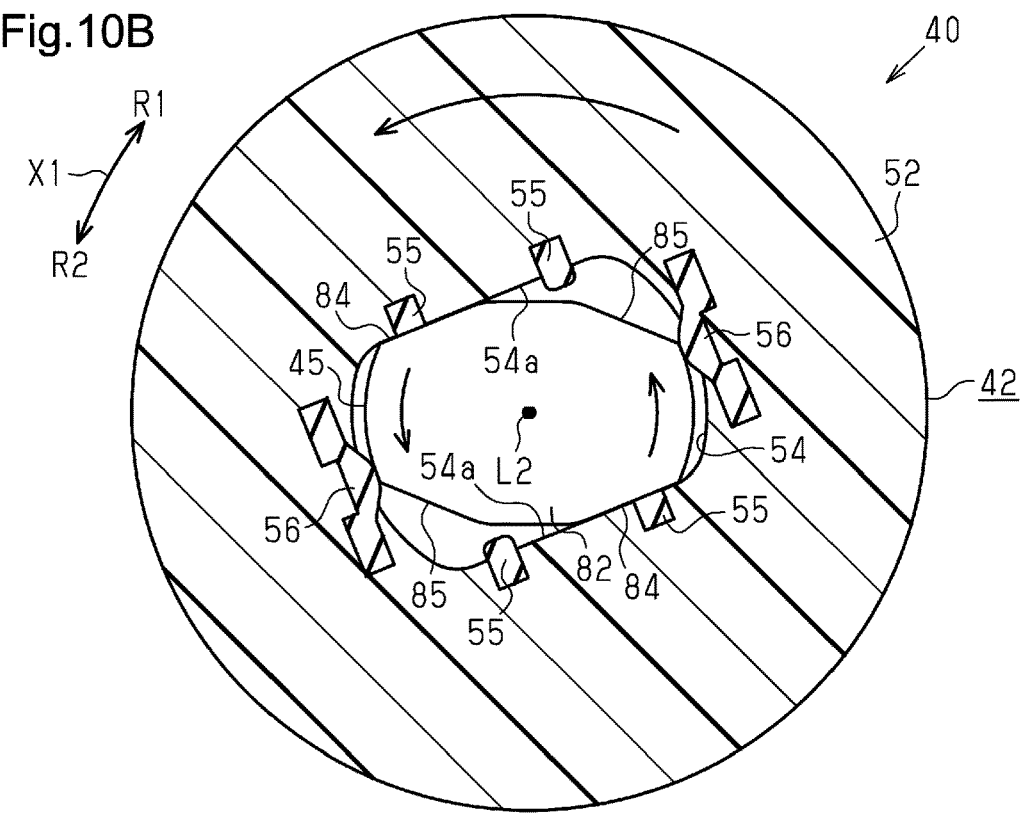

As shown in FIGS. 2, 10A, and 10B, when the motor unit 20 is driven and the drive-side rotation body 42 rotates together with the rotation shaft 24 in the second direction R2, the clutch 40 couples the rotation shaft 24 to the worm shaft 34 in the same action as when the drive-side rotation body 42 rotates in the first direction R1 (refer to FIG. 8) but each member rotates in the opposite direction. More specifically, as the drive-side rotation body 42 rotates in the second direction R2, the circumferential end (elastic portion 58) of each rolling element releaser 57 of the drive-side rotation body 42 located forward in the rotation direction comes into contact with the second roller support 64b of the corresponding one of the rolling element retainers 62 and pushes the second roller support 64b and the rolling element 44 in the second direction R2. As a result, the rolling elements 44 are located at the circumferential center of the respective control surfaces 83 of the driven-side rotation body 45 and thus enter the unlocked state in which the rolling elements 44 are not held between the clutch housing 41 and the control surfaces 83. In the unlocked state, when the drive-side transmission surfaces 54a of the drive-side rotation body 42 come into contact with the first driven-side transmission surfaces 84 of the driven-side coupling portion 82 in the second direction R2, the rotational drive force of the drive-side rotation body 42 (rotation shaft 24) is transmitted to the driven-side rotation body 45 (worm shaft 34) and integrally rotates the rotation shaft 24 and the worm shaft 34 in the second direction R2.

At this time, as shown in FIGS. 5 and 10A, as the second roller supports 64b are pushed by the rolling element releasers 57 in the second direction R2, the support member 43 and the rolling elements 44 rotate together with the drive-side rotation body 42 and the driven-side rotation body 45 about the rotation axis of the drive-side rotation body 42. Then, a frictional force between the inner circumferential surface 41c of the clutch housing 41 and the rolling elements 44 causes the rolling elements 44 to rotate between the paired roller supports 64a and 64b in the opposite direction with respect to the rotation direction of the support member 43 about the center axis L3. When the rolling elements 44 are rotated about the center axis L3 by an amount allowed by the allowance gap G1 between the roller supports 64a and 64b, opposite sides of the rolling elements 44 in the rotation direction X1 come into contact with the roller supports 64a and 64b. In the present embodiment, when the drive-side rotation body 42 is rotated in the second direction R2, each rolling element 44 comes into contact with the first contact surface 68a via the end of the first opposing surface 71a located toward the second arcuate surface 72b and comes into contact with the second contact surface 68b via the end of the second opposing surface 71b located toward the first arcuate surface 72a. Thus, the support member 43 restricts the rotation of the rolling elements 44 about the center axis L3. Even when the drive-side rotation body 42 is driven to rotate and the rolling elements 44 are rotated together with the drive-side rotation body 42 about the rotation axis of the drive-side rotation body 42, the rolling elements 44 are rotated about the center axis L3 in only the range allowed by the support member 43.

When rotation of the worm shaft 34 in the second direction R2 is transmitted to the output shaft 38 and output from the output shaft 38, the vehicle window glass is raised and lowered via the window regulator, which is not shown in the drawings, in accordance with the rotation direction of the output shaft 38. When the energization to the motor unit 20 is stopped, the driving and rotation of the rotation shaft 24 is stopped, that is, the driving and rotation of the drive-side rotation body 42 is stopped. After the driving of the motor unit 20 is stopped, as described above, the rolling elements 44 act as wedges and hamper the rotation of the driven-side rotation body 45 (i.e., lock rotation of the worm shaft 34), thereby hampering the rotation of the output shaft 38 (refer to FIG. 9A).

The advantages of the present embodiment will now be described.

(1) The distal surface of the support member 43 includes inclined portions 66a corresponding to a guide configured to guide the grease GR that is unevenly applied to the inner circumferential surface 41c of the clutch housing 41 to be evenly applied to the inner circumferential surface 41c of the clutch housing 41 when inserted into the clutch housing 41. When the support member 43 is coupled to the clutch housing 41, the grease GR is nearly evenly applied to the inner circumferential surface 41c of the clutch housing 41. This improves initial properties of the clutch 40 and ultimately improves initial properties of the motor 10. As a result, for example, a post-manufacturing property inspection is quickly performed with high accuracy.

(2) The inclined portions 66a are inclined toward the basal side (upper side in FIG. 4A) from the axial center (center axes L1 and L2) toward the radially outer side. When inserted into the clutch housing 41, the grease GR that is unevenly applied to the inner circumferential surface 41c of the clutch housing 41 is appropriately guided to be evenly applied to the inner circumferential surface 41c of the clutch housing 41. Specifically, for example, when inserted into the clutch housing 41, radial inward movement of the grease GR that is unevenly applied to the inner circumferential surface 41c of the clutch housing 41 is hampered. In addition, for example, the inclined portions 66a guide the grease GR that is unevenly applied to the inner circumferential surface 41c of the clutch housing 41 and protruding radially inward from the inner circumferential surface 41c so that the grease GR moves toward the inner circumferential surface 41c of the clutch housing 41 when inserted into the clutch housing 41. In addition, for example, the grease GR that is applied to the basal side of the inner circumferential surface 41c of the clutch housing 41 is guided to spread to the distal side of the inner circumferential surface 41c of the clutch housing 41 when inserted into the clutch housing 41. The inclined portion 66a of the present embodiment is arranged so that the radial outer end of the inclined portion 66a is located at the basal side of (upper side in FIG. 4A) the lower surface of the rolling element 44. When the support member 43 is rotated and the centrifugal force directs the residual grease GR on the inclined portion 66a toward the inner circumferential surface 41c of the clutch housing 41, the grease GR is guided to the basal side of the lower surface of the rolling element 44 (toward the center in the axial direction). The grease GR is effectively used to improve properties of the clutch 40.

(3) The manufacturing method includes the applying step that applies the grease GR to the basal side of the inner circumferential surface 41c of the clutch housing 41 and the inserting step that inserts the support member 43 into the clutch housing 41 subsequent to the applying step to spread the grease GR to the distal side of the inner circumferential surface 41c of the clutch housing 41. As a result, when the support member 43 is coupled to the clutch housing 41, the grease GR is nearly evenly applied. This improves initial properties of the clutch 40, and ultimately initial properties of the motor 10.

The present embodiment may be modified as follows. The embodiment and the following modified examples can be combined as long as the combined modified examples remain technically consistent with each other.

In the embodiment, the inclined portion 66a is used as a guide arranged on the distal surface of the support member 43. The guide may be changed to other configurations as long as the guide is configured to guide the grease GR that is unevenly applied to the inner circumferential surface 41c of the clutch housing 41 to be evenly applied to the inner circumferential surface 41c of the clutch housing 41 when inserted into the clutch housing 41.

Figure 11:
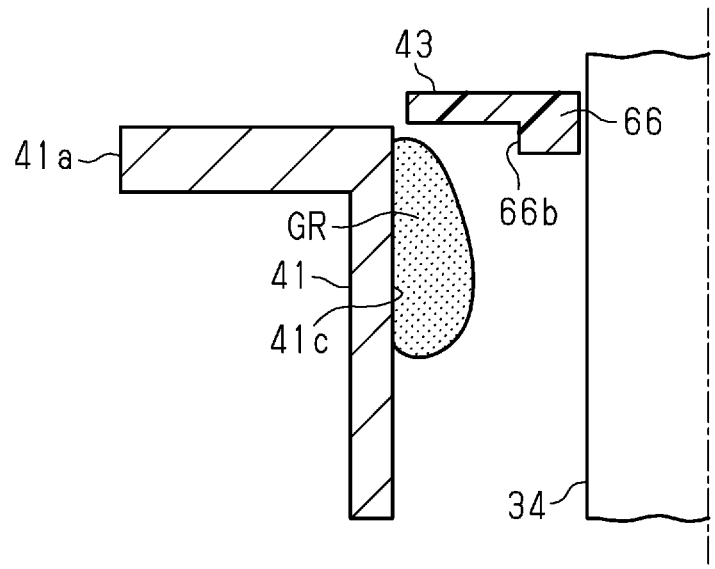
FIG. 11 is a partial schematic cross-sectional view showing a further example of a clutch.

For example, the guide may be changed as shown in FIG. 11. In this example, a restriction wall 66b is arranged on the coupling portion 66 of the support member 43 and is used as a guide located at a radially inner side and projecting toward the distal side. The restriction wall 66b guides the grease GR that is unevenly applied to the inner circumferential surface 41c of the clutch housing 41 so that radial inward movement of the grease GR is hampered when inserted into the clutch housing 41.

Also, with this configuration, when the support member 43 is coupled to the clutch housing 41, the grease GR is nearly evenly applied to the inner circumferential surface 41c of the clutch housing 41 as compared to a configuration that does not include the guide (i.e., configuration in which the distal surface of the coupling portion 66 is simply flat). More specifically, when inserted into the clutch housing 41, radial inward movement of the grease GR that is unevenly applied to the inner circumferential surface 41c of the clutch housing 41 is hampered. Thus, as compared to a configuration that does not include the restriction wall 66b, the grease GR is guided to be evenly applied to the inner circumferential surface 41c of the clutch housing 41. This improves initial properties of the clutch 40 and ultimately improves initial properties of the motor 10.

Figure 12:
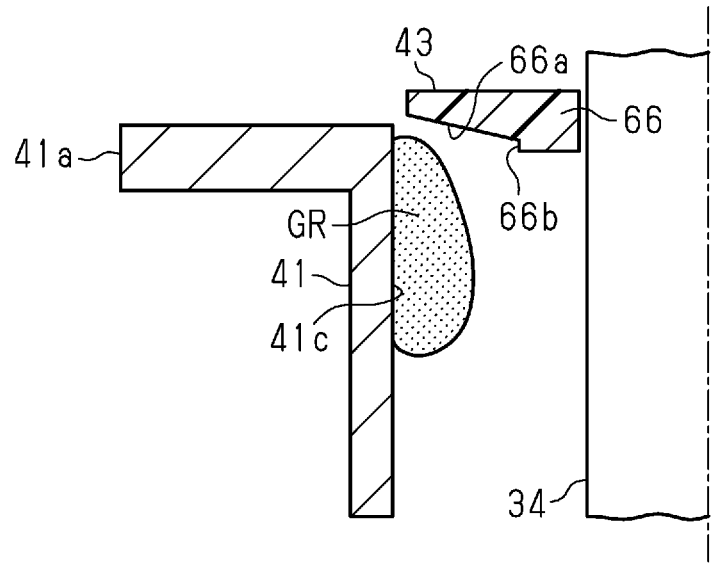
FIG. 12 is a partial schematic cross-sectional view showing a further example of a clutch.

As shown in FIG. 12, in addition to the inclined portion 66a of the embodiment, the restriction wall 66b may be arranged at a radially inner side of the inclined portion 66a.

In the embodiment, the manufacturing method is for a structure including the support member 43 having the distal surface including the guide (i.e., inclined portion 66a and restriction wall 66b). The same manufacturing method may be used for a structure including a support member that does not include a guide (i.e., the distal surface of the coupling portion 66 is simply flat). Also, with this configuration, the grease GR spreads to the distal side of the inner circumferential surface 41c of the clutch housing 41. When the support member is coupled to the clutch housing 41, the grease GR is nearly evenly applied.

In the embodiment, the present disclosure is embodied in the motor 10 including the clutch 40. The present disclosure may be embodied in a device other than the motor including the clutch 40.

The present disclosure is described in accordance with exemplified examples but is not limited to the exemplified examples and its structure. The present disclosure embraces various modified examples and variations within the scope of equivalents. In addition, various combinations and forms, and other combinations and forms including only one element or more or less than one element are also within the scope and spirit of the present disclosure.

The invention claimed is:

1. A clutch, comprising:
an annular clutch; housing;
a drive-side rotation body configured to be driven to rotate;
a driven-side rotation body to which rotational drive force is transmitted from the drive-side rotation body;
a rolling element arranged between an inner circumferential surface of the clutch housing and the driven-side rotation body, wherein when the drive-side rotation body is driven to rotate, the rolling element rotates together with the drive-side rotation body about a rotation axis of the drive-side rotation body, and when the drive-side rotation body is not driven to rotate, the rolling element is held between the inner circumferential surface of the clutch housing and the driven-side rotation body and hampers rotation of the driven-side rotation body;
a support member, wherein when inserted into and fastened to the clutch housing from a distal side, the support member holds the rolling element between the inner circumferential surface of the clutch housing and the driven-side rotation body and rotates together with the drive-side rotation body about the rotation axis of the drive-side rotation body; and
grease located between the inner circumferential surface of the clutch housing and the rolling element, wherein
the support member includes a guide arranged on a distal surface of the support member,
when the grease is unevenly applied to the inner circumferential surface of the clutch housing, the guide is configured to guide the grease to be evenly applied to the inner circumferential surface of the clutch housing when inserted into the clutch housing.

2. The clutch according to claim 1, wherein the guide includes an inclined portion inclined toward a basal side from an axial center toward a radially outer side.

3. The clutch according to claim 1, wherein
the guide includes a restriction wall located at a radially inner side and projecting toward a distal side, and
the restriction wall is configured, when the support member is inserted into the clutch housing, to hamper radial inward movement of the grease unevenly applied to the inner circumferential surface of the clutch housing.

4. A motor, comprising:
a motor unit including a rotation shaft configured to be driven to rotate;
the clutch according to claim 1 including the drive-side rotation body configured to rotate integrally with the rotation shaft; and
an output unit including a driven shaft configured to rotate integrally with the driven-side rotation body, the output unit being configured to output rotational drive force transmitted to the driven shaft.

5. A method for manufacturing a clutch including: an annular clutch housing; a drive-side rotation body configured to be driven to rotate; a driven-side rotation body to which rotational drive force is transmitted from the drive-side rotation body; a rolling element arranged between an inner circumferential surface of the clutch housing and the driven-side rotation body, when the drive-side rotation body is driven to rotate, the rolling element rotating together with the drive-side rotation body about a rotation axis of the drive-side rotation body, and when the drive-side rotation body is not driven to rotate, the rolling element being held between the inner circumferential surface of the clutch housing and the driven-side rotation body and hampering rotation of the driven-side rotation body; a support member, when inserted into and coupled to the clutch housing from a distal side, holding the rolling element between the inner circumferential surface of the clutch housing and the driven-side rotation body and rotating together with the drive-side rotation body about the rotation axis of the drive-side rotation body; and grease located at least between the inner circumferential surface of the clutch housing and the rolling element, the method comprising:
  applying the grease to a basal side of the inner circumferential surface of the clutch housing; and
  after the applying, inserting the support member into the clutch housing, thereby spreading the grease to a distal side of the inner circumferential surface of the clutch housing.

* * * * *